United States Patent [19]

Adams, Jr.

[11] 4,185,468
[45] Jan. 29, 1980

[54] APPARATUS FOR SEPARATION, REFINEMENT, EXTRACTION AND/OR CONCENTRATION BY LIQUATION

[76] Inventor: Clyde M. Adams, Jr., 3509 Biddle St., Cincinnati, Ohio 45220

[21] Appl. No.: 923,941

[22] Filed: Jul. 13, 1978

Related U.S. Application Data

[63] Continuation-in-part of Ser. No. 882,256, Feb. 28, 1978, abandoned.

[51] Int. Cl.$^2$ .............................................. B01D 9/04
[52] U.S. Cl. ........................................ 62/123; 62/532; 62/543
[58] Field of Search ................... 62/532, 543, 123, 124

[56] References Cited

U.S. PATENT DOCUMENTS

| | | | |
|---|---|---|---|
| 3,170,779 | 2/1965 | Karnofsky | 62/543 |
| 3,293,872 | 12/1966 | Rowekamp | 62/532 |
| 3,349,573 | 10/1967 | Rowekamp | 62/532 |

Primary Examiner—Norman Yudkoff
Attorney, Agent, or Firm—James E. Anderson

[57] ABSTRACT

Apparatus for separation of mixtures wherein a mixture is cooled very slowly in a quiescent, nondisturbed condition to produce large dendritic crystals of solidified solvent, then heated very slowly while liquid of high solute concentration is drained from the large interstices between the crystals, the cooling and reheating being effected by slowly conveying containers of mixture in a continuous circular path through a long heat transfer conduit or tunnel having a central refrigeration zone. Adjacent trains of containers travel through the tunnel in opposite directions. Arrangements are provided for collecting liquid having high concentrations of solute and recycling this liquid back through the foregoing process in said containers after they have been emptied of liquid treated in a preceding cycle.

8 Claims, 4 Drawing Figures

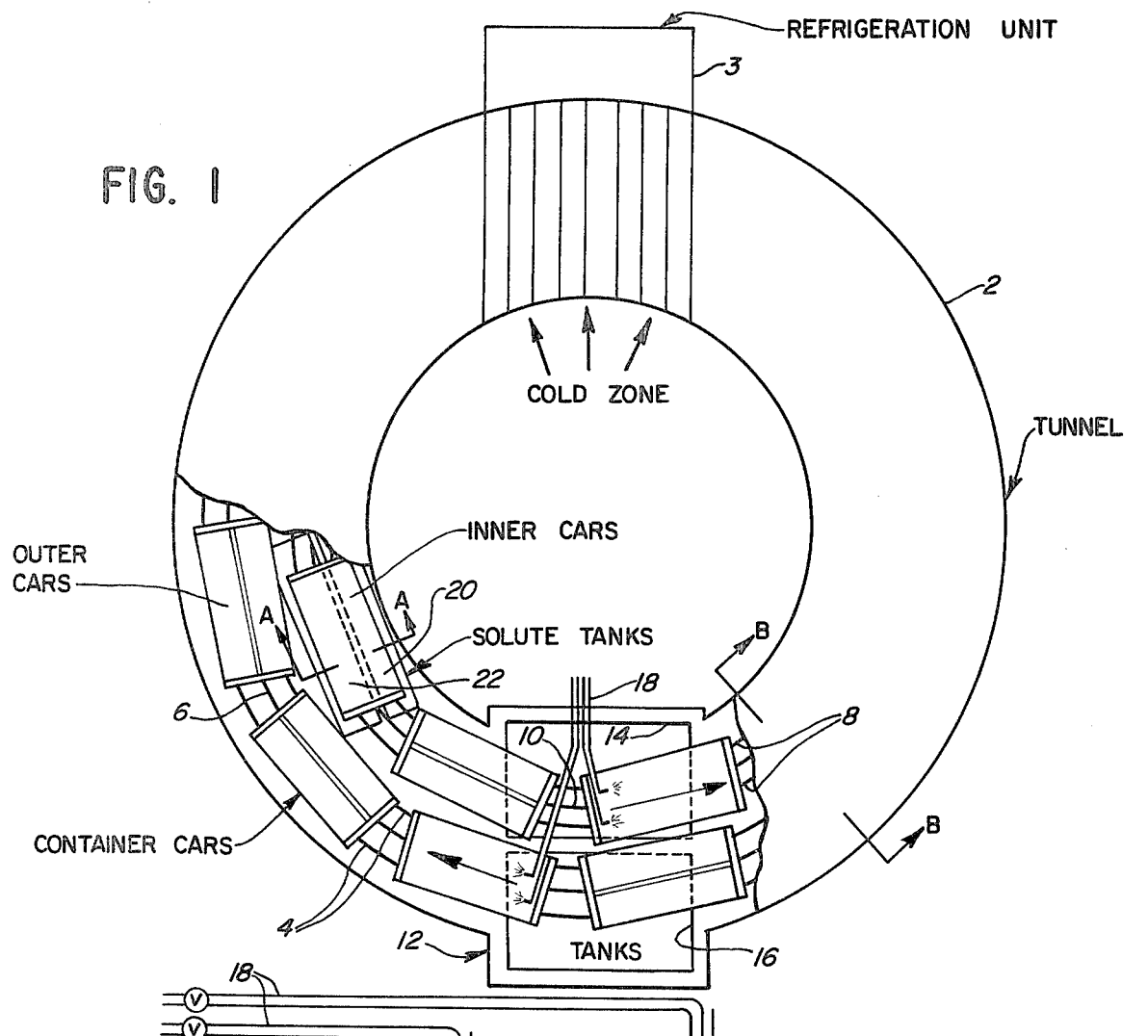
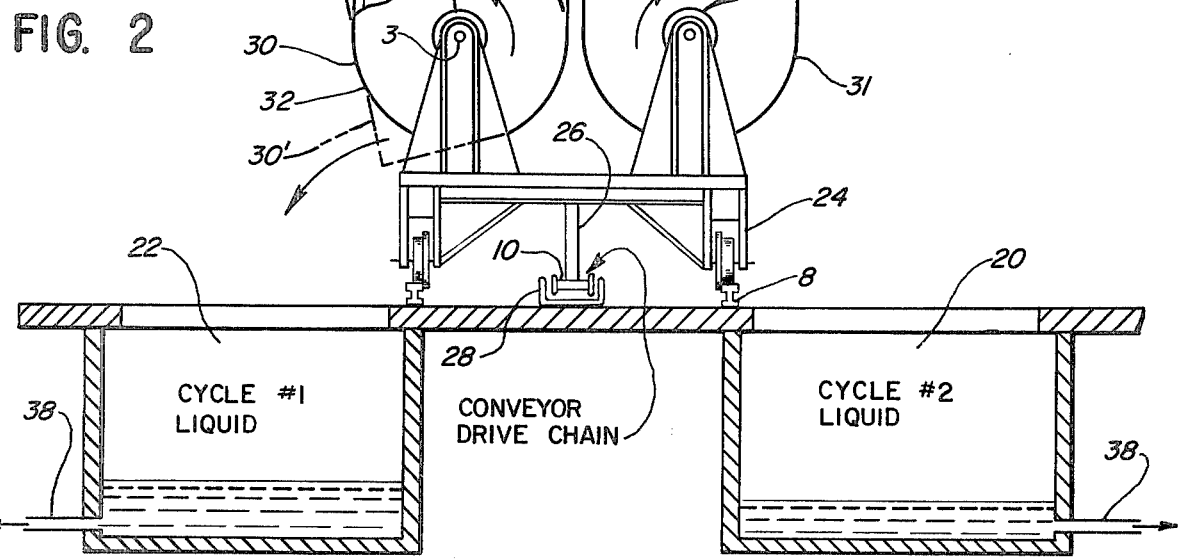

APPARATUS FOR SEPARATION, REFINEMENT, EXTRACTION AND/OR CONCENTRATION BY LIQUATION

CROSS-REFERENCE TO RELATED APPLICATION

This application is a continuation-in-part of my copending application Ser. No. 882,256, filed Feb. 28, 1978 now abandoned.

BACKGROUND OF THE INVENTION (1) Field of the Invention

Treatment of impure, mixed or contaminated liquids or fusible solids for any or all of the purposes of extraction of valuable products, removal of pollutants, concentration of wastes, concentration of solutions, and separation of mixtures into valuable portions, utilizing the principle of liquation. Inasmuch as all of the above-stated objectives involve unmixing or separation, they all are intended to be embraced within the term "separation" for purposes of describing the present invention.

(2) Description of the Prior Art

Two primary methods of thermal separation of constituents in aqueous mixtures are (1) by distillation or evaporation, and (2) freezing, or fusion. In the case of desalination, salt can be extracted by reverse osmosis and electrodialysis. Thermal separation by distillation and evaporation inherently are heat (energy) consumptive. The most common method of separation by crystallization involves direct contact between the mixture and recycled hydrocarbon gases, which are vaporized and condensed, respectively, to freeze the water and then melt the ice crystals after removal of the solute. Again, in this approach, the costs of hydrocarbons, energy consumption, capital investment and operating costs are prohibitive in terms of kilowatt-hours per pound of potable water or of water that is acceptable for discharge into waterways under applicable governmental regulations.

While distillation equipment, multiple effect evaporators, vapor compression units and direct contact crystallization may be economically feasible for shipboard use and small land-based waterworks, their energy consumption renders them virtually unsuitable for purposes of fulfilling the enormous daily effluent requirements of large industrial plants or for desalination in large waterworks projects. In the prior art, U.S. Pat. Nos. 3,349,573 and 3,293,872 and (Rowekamp) espouse "solar freezing" for desalination of seawater in frigid regions of the world which have long, cold winters, by exposing water in shallow trays to the extreme cold atmosphere and very rapidly forming crystals of pure water, from which brine solution is washed away. While this application of the old principle of "liquation" may be feasible on a small scale in arctic regions, it is of no practical benefit or consolation for very large scale industrial applications in warmer climates. Furthermore, the Rowekamp conception of very rapid freezing, which is the antithesis of this invention, would not produce large dendritic crystals with large interstices for containment of high concentration solute.

In the field of pure metallurgy, the sciences of crystal growth and liquation have been studied for perhaps centuries. Liquation is the method of separation of the components of a mixture which depends upon the differences in their fusibility, the conditions necessary for their separation being produced either as the result of partial fusion of a solid mixture by heating, or partial solidification of a liquid mixture by cooling. For example, bismuth was at one time freed from accompanying vein stuff by heating the crude ore in externally heated sloping tubes, whereby the metal melted and drained away, leaving the gangue behind. In the smelting of some metals of low melting point, like tin, such metal impurities in the ore as iron and copper are reduced and dissolved in the tin to a large extent at the higher smelting temperature, and when tapped and solidified the crude metal thus contains more of these impurities than corresponds to their solubility at the melting point of tin; thus, upon reheating a little above the melting point tin sweats out, or liquates, leaving the greater part of the impurities in the solid liquation residue.

In the field of crystallization in general, it is known that crystals often develop a dendritic (treelike) morphology, the trunk and arms of which are usually parallel to definite crystallographic directions. This form permits rapid crystal growth because the tips of the dendritic arms are always near parts of the medium which are relatively undepleted in the crystallizing component and unwarmed by the heat of crystallization. Crystal growth, specifically, is the enlargement of crystals at the expense of materials in contact with them and depends on the rate of diffusion of impurities and the rate of heat flow away from the growing crystal surfaces. It follows that the bounding planes of the crystals are perpendicular to the direction of slowest growth and parallel to planes of densest molecular packing. The more rapidly a crystal is grown and the less pure its growth environment, the greater the number and variety of imperfections it acquires, and tending toward formation of many small crystals, or crystallites (polycrystalline). Comparatively slow rates of formation are required to produce large single crystals free of crystallite grains.

A further reference on the subject of crystallization is the following publication in which I was named as a co-author:

"Dendritic Crystallization of Ice from Aqueous Solutions" by Pradeep K. Rohatgi, Surendar M. Jain and Clyde M. Adams, Jr., published in I & EC FUNDAMENTALS Vol. 7, Page 72, February 1968. (Copyright American Chemical Society.)

Notwithstanding prior knowledge of the above principles and finer theoretical aspects of the art (primarily in metallurgical and chemical applications), means for liquation separation which are substantially conservative of energy, and hence applicable to large scale operations such as heavy industrial water purification plants, have not been revealed heretofore in terms according to the present invention.

SUMMARY OF THE INVENTION

Treatment of mixtures to separate constituents utilizing principles of liquation, and more particularly such treatment of polluted water wherein crystallization and remelting take place in a quiescent, undisturbed state and at heat transfer rates sufficiently low to promote the formation of large dendritic crystal structures with spacing between the dendritic elements large enough to enhance removal of high concentration solute during slow reheating.

In a preferred embodiment of the invention, in apparatus for treatment and separation of aqueous mixtures, a mixture is transported through a long circular or oval heat transfer conduit or tunnel in containers under quiescent, nondisturbed conditions, i.e., without agitation, as would be caused by pumping, stirring, liquid flow or inertia, and with a residence time of the order of many hours or possibly a few days, so that slow dendritic crystal growth and remelting take place. Trains of containers circling in one direction through a centrally located refrigeration zone in the tunnel pass trains of containers circling in the opposite direction, whereby containers of liquid (uncrystallized) mixture entering the tunnel are gradually cooled by loss of heat to cooler containers of melting dendritic crystals leaving the cooling zone.

Each container car carries separate tanks adapted to hold mixtures of different degrees of purification (or pollution) and to be emptied independently into selected tanks beneath or alongside the paths of travel of the cars. Thus it is possible to carry, for example, batches of raw, untreated water in one set of containers on a train while simultaneously also recycling in another set of tanks batches of brine concentrate that has been separated during one or more previous cycles of treatment. Containers are overturned to effect drainage of concentrated liquid solute into discharge tanks and are then uprighted in response to sensing of the electroconductivity of the draining liquid solute.

BRIEF DESCRIPTION OF THE DRAWINGS

FIG. 1 is a plan view, partly broken away to reveal the internal container car trains, of a treatment facility having an annular configuration in accordance with this invention;

FIG. 2 is a vertical section taken as indicated at A—A in FIG. 1;

DESCRIPTION OF THE PREFERRED EMBODIMENT

Figure 3:
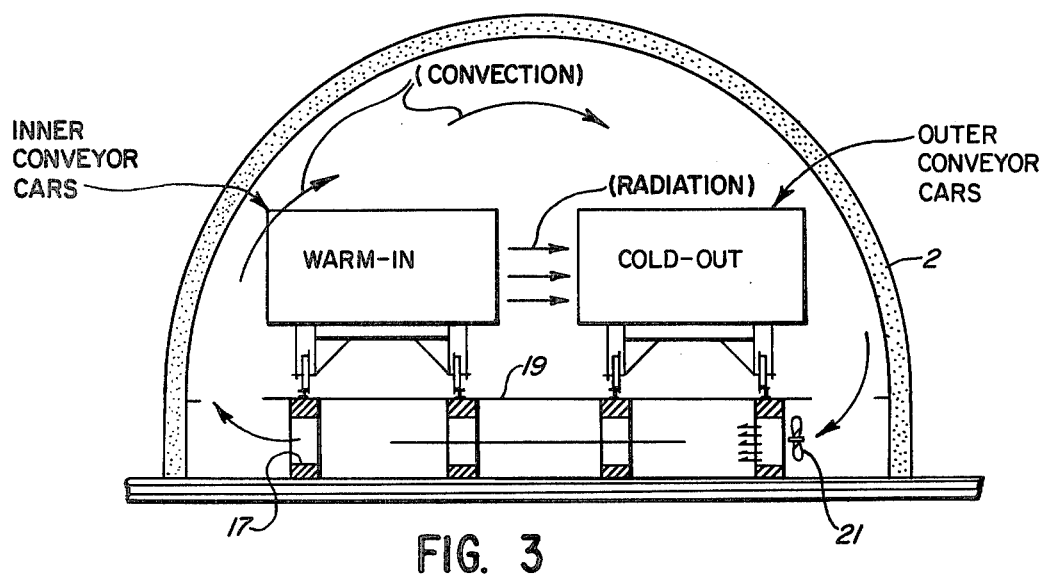
FIG. 3 is a schematic vertical section through the tunnel, taken as indicated at B—B in FIG. 1.

Referring to FIGS. 1 and 3, there is illustrated a circular (or doughnut-shaped) conduit or tunnel 2 comprising a heavily insulated quontset-type of building. The center-line diameter of tunnel 2 may be of the order of 100 to 200 feet, depending on various factors such as the composition of the polluted mixtures to be treated and the degree of purification required. The coldest zone of the tunnel is created by a refrigeration unit 3, which can be considered as being diametrically opposite to the zone at which temperature is highest—approximately ambient temperature as hereinafter discussed—and where a cycle of water treatment begins and ends. Within the tunnel 2 there are provided at least two endless trains of container cars travelling in opposite directions; the radially outward cars are driven very slowly along rails 4 by means of an endless chain 6, and inner cars are driven very slowly on rails 8 by means of a chain 10.

Opposite the cold zone 3 is a transition station, generally indicated at 12, at which container cars are refilled with a new batch of either raw untreated water or previously separated (recycled) water concentrate immediately after dumping of clean water into holding tanks 14 and 16. Through supply pipes 18, the same raw, previously untreated water can be pumped into all of the separate compartments of the container cars, or only some of the compartments; some cars can receive only raw untreated water while others receive only the highly concentrated liquid solute that has undergone separation through one, two or more passes through the refrigerated tunnel 2.

The term "treatment" as used herein means the process described and claimed in my copending application Ser. No. 882,256, according to which a polluted liquid mixture is moved very slowly through a cooling zone in a substantially quiescent and undisturbed state, and at a controlled and very low freezing rate sufficient to produce large plate-like ("dendritic") crystals of substantially pure solvent; then raising the temprature at a controlled and very low rate of heat absorption while effecting drainage of solute from between the crystals of pure solvent. As more specifically described in said copending application, water typically may enter the conduit or tunnel 2, at the transition station 12, at a temperature of approximately 20° to 30° C. and leave it at approximately 10° to 20° C., after experiencing very slow freezing at temperatures in the range of −10° to −30° C. As also described hereafter, in this embodiment of the invention the drainage of liquid high in solute concentration is effected by overturning or tilting of individual tanks 30 (FIG. 2) or trays 45 (FIG. 4) to dump it into holding tanks. A significant economic advantage of this inventiin is its theoretically low energy consumption, e.g., in terms of kilowatt hours per 1000 gallons of processed water or other liquid waste. One principal reason for this result is that because of the heat transfer between container cars of water leaving and approaching the cold zone, the water in the container cars enters and leaves the transition zone 12 at approximately the same temperature, or with perhaps a maximum temperature difference of about 10° C. Referring to FIG. 3, convective heat transfer is effected by means of ducts 17 provided in foundations beneath the rails 8 and the platform floor 19 within the tunnel, and a blower or fan 21 for drawing air from the cold side of the tunnel and forcing it across to the warm side. (Some lesser degree of transfer occurs by radiation from the warmer inbound cars to the colder cars leaving the cold zone.)

Although there may be a temperature differential between liquid entering and leaving the system at the transition zone 12, it should not be assumed that this necessarily represents a heat loss, for the transition zone itself can be an enclosed part of the closed tunnel system itself; within the enclosed transition zone the cold water in the tanks 16 and 18 should be held there for periods of time adequate to absorb heat before it is pumped out of the system at close to the outside ambient temperature at which the raw waste water entered the overall system. Thus the principal load on the refrigeration unit will be to make up for thermal losses in the tunnel.

The very slow cooling of water or other liquid in transit to the cold zone—which process may take from about 12 to 48 hours—is followed by deliberately slow and controlled melting of the liquid, high in solute concentration, between the large plate-like dendritic crystals (as distinguished from closely massed intercrystalline growths) that have resulted from the slow and purposeful freezing under quiescent, non-disturbed conditions. The mechanism for drainage of such liquid solute will be described with reference to FIGS. 2 and 4.

Each railway car 24 has wheels on which it rolls smoothly along the rails 8. Each car is connected to its driving chain 10 and is pushed by means of a bracket 26.

Each driving chain is guided within a channel 28 in the manner of conventional conveyor systems.

On each car 24 there may be one, two or more independent compartments or tanks, each of which can carry a different composition of water or other liquid to be treated, e.g., (a) untreated, raw waste water, (b) liquid solute drained from previous batches of pure water ice crystals, or (c) recycling of relatively pure water solvent resulting from previous trips through the refrigerated tunnel 2. The last-mentioned alternative (c) is not considered to be generally feasible owing to the high residence time consumed for the sake of attaining only a slightly greater degree of purification of relatively pure water, as compared to alternative (b). In the latter case, recycling of brine concentrate to separate the pure aqueous fraction both decreases the volume of waste (salt) to be disposed of as well as increasing the percentage of pure water recovered.

In the case of FIG. 2 there are two tanks, 30 and 31, identically mounted on the car. Tank 30 is rotatably supported at each end in a bearing 33 on a pedestal mount 32. An integrated electric motor, ring gear and gear reduction unit, generally numbered 34, is initiated to turn over the tank 30 to a position 30' at a predetermined point after the car has passed the cold zone 3, thereby discharging its liquid solute portion of contents into the basin or tank 22. A grate 36 at the open side of the tank serves to prevent dumping of frozen ice crystals, while permitting drainage of liquid solute. As disclosed and claimed in my above-identified copending application, the tank 30 is returned to its upright condition in response to means (conventional per se and not shown) for sensing the electroconductivity of discharged liquid, which indicates that relatively pure water is begining to be drained off.

The presence of inlet pipes 18 in FIG. 2 is intended to illustrate the overhead relation of these pipes to the separate compartments or tanks as shown in FIG. 1.

In practice, each car may be between 15 and 40 feet long, 8 to 12 feet wide, and 4 to 6 feet in height above the car platform. Thus the total liquid contents of the tanks on a single car may be in the range of 5,000 to 20,000 gallons, and at any time there may be of the order of 250,000 to 750,000 gallons of liquid in container cars passing through the tunnel 2. The circumference, or length, of the tunnel 2, the speed of travel of the containers and intensity of refrigeration output at the cold zone are all factors determining the performance of the system; the last two factors are controllable, depending upon the composition of liquid mixture being treated and other factors.

While the tunnel 2 in this illustrated embodiment is circular in layout, it may follow a different closed circuit path, such as an oval shape. Also, there can be loops of track leaving the tunnel and leading out of and back to the transition section 12. The cars 24 need not be permanently connected to their driving chains, but may be removably connected so that cars can be sidetracked from the system for various reasons.

Figure 4:
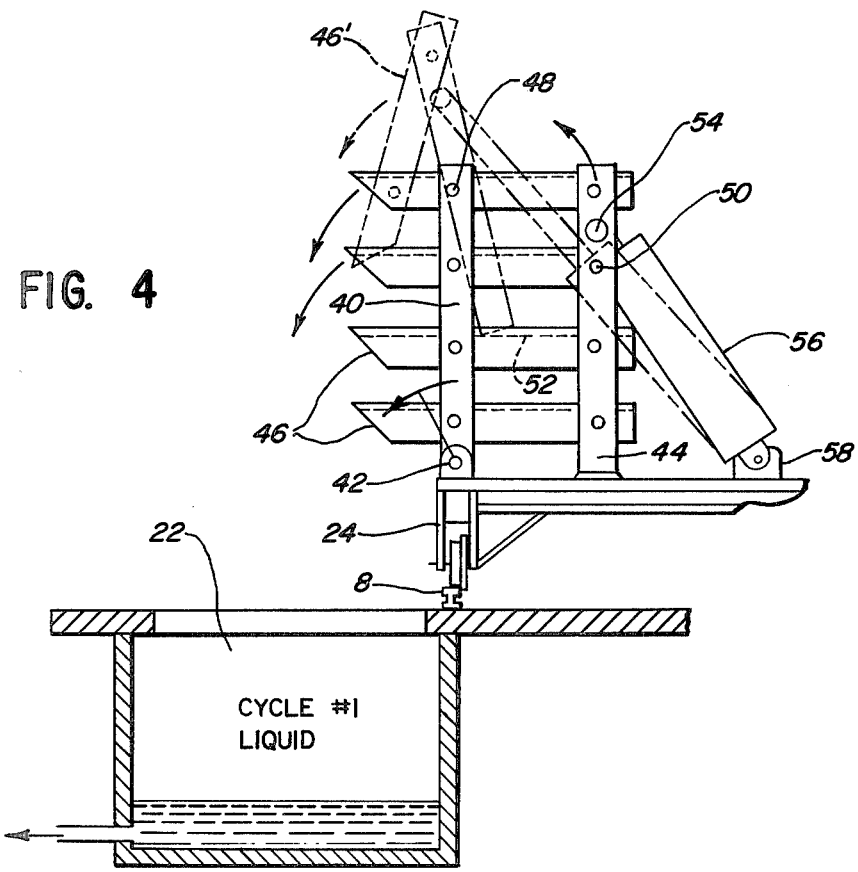
FIG. 4 is a vertical section, similar to FIG. 3, showing a modified embodiment of a container car.

The advantage of the arrangement shown in FIG. 4 is that long shallow trays 46 provide more uniform exposure to refrigeration, and hence a more uniform and orderly progression of dendritic crystal grown as compared to the larger masses of water contained in the tanks 30. Each of the trays 46 will measure about 15 to 20 feet in length, 4 to 8 feet in width, and 6 to 8 inches in depth. At each end of the lengths of tiered trays 46, they are supported on a first frame member 40, which is pivotally secured to the car chasis by a bearing 42, and a second upright frame member 44. Trays 46 are pivotally connected to members 40 and 44 by shafts supported in bearings 48 and 50, respectively. Each tray is provided with a grating 52, for the same purpose as the grating 36 in FIG. 2. A double acting hydraulic piston unit 56 is connected between a pivotal mounting bracket 58 and a shaft 54 on the frame member 44. Upon actuation of hydraulic unit 56, all of the trays are moved laterally and are tilted to a vertical position as indicated at 46' to effect drainage of liquid solute from the ice crystals.

It should be apparent from the foregoing description that the provision of separate compartments, trays or tanks on the container cars, and the separate discharge tanks and selective means for filling the same with different raw or recycled mixtures is one significant feature of this invention. Another significant feature is the completely closed, insulated system in which the slow freezing and remelting steps take place with a low consumption of energy.

What is claimed is:

1. Apparatus for separating a substantially liquid mixture containing solvent and dissolved and/or undissolved foreign matter comprising:
   means providing a long, tunnel-like and thermally insulated conduit defining a closed circular loop;
   multiple conveyor means for carrying containers of the liquid through said conduit in opposite directions and in heat exchange relation to each other;
   means gradually cooling said mixture in a quiescent and undisturbed state while the same is conveyed in said containers toward an intermediate zone within said conduit;
   means for effecting removal of concentrated liquid rich in solute from spaces between solidified crystals of solvent as it is conveyed beyond said intermediate zone;
   means located between said cooling means and removal means in the direction of travel of each conveyor means for recovering the relatively pure liquid resulting from continued melting of said crystals; and
   means located ahead of the location of the last-mentioned means in the direction of travel of each conveyor means for refilling said containers with a substantially liquid mixture containing solvent and dissolved and/or undissolved foreign matter.

2. Appratus according to claim 1, wherein said removal means includes means positioned along the path of travel of said containers for receiving said liquid rich in solute, and said refilling means is adapted to draw liquid from the last-mentioned means to refill said containers.

3. Apparatus according to claim 1, wherein said removal means includes means for overturning said containers to induce gravitational drainage of the liquid rich in solute therefrom and tanks positioned adjacent the path of travel of said containers for receiving the same.

4. Apparatus according to claim 3, wherein said refilling means is adapted to draw said liquid from said tanks to refill said containers.

5. Apparatus according to claim 1, wherein said pure liquid recovery means and refilling means are contained in an enclosed housing comprising an extension of the closed environment provided by said conduit.

6. Apparatus according to claim 5, wherein said pure liquid recovery means comprises at least one tank positioned along the path of travel of said containers for receiving said relatively pure liquid, and means for overturning said containers to induce gravitational drainage of the liquid into said tank.

7. Apparatus according to claim 1, wherein said containers comprise long, shallow, open-topped trays for holding a liquid, grating covering the tops of said trays to obstruct emptying of said crystals therefrom, and wherein said means for effecting removal of liquid rich in solute comprises means for overturning said trays.

8. Apparatus according to claim 1, wherein said cooling means comprises refrigeration means located within the conduit at said intermediate zone.

* * * * *

UNITED STATES PATENT AND TRADEMARK OFFICE
CERTIFICATE OF CORRECTION

PATENT NO. : 4,185,468
DATED : Jan. 29, 1980
INVENTOR(S) : Clyde M. Adams, Jr.

It is certified that error appears in the above-identified patent and that said Letters Patent are hereby corrected as shown below:

Page 1, Column 1, under "Related U.S. Application Data", line 2, change "abandoned" to -- now U.S. Patent No. 4,177,051 --

Signed and Sealed this

Twenty-third Day of September 1980

[SEAL]

Attest:

SIDNEY A. DIAMOND

Attesting Officer

Commissioner of Patents and Trademarks